United States Patent
Cheng et al.

(10) Patent No.: US 7,684,366 B2
(45) Date of Patent: *Mar. 23, 2010

(54) APPARATUS, AND ASSOCIATED METHOD, FOR SELECTING QUALITY OF SERVICE-RELATED INFORMATION IN A RADIO COMMUNICATION SYSTEM

(75) Inventors: Mark W. Cheng, San Diego, CA (US); LiangChi (Alan) Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 86 days.

This patent is subject to a terminal disclaimer.

(21) Appl. No.: 11/969,433

(22) Filed: Jan. 4, 2008

(65) Prior Publication Data

US 2008/0101257 A1 May 1, 2008

Related U.S. Application Data

(63) Continuation of application No. 10/921,088, filed on Aug. 18, 2004, now Pat. No. 7,336,632.

(60) Provisional application No. 60/496,177, filed on Aug. 18, 2003.

(51) Int. Cl.
*H04Q 7/00* (2006.01)
*G06F 11/00* (2006.01)
*H04L 12/28* (2006.01)

(52) U.S. Cl. ........................ 370/329; 370/235; 370/328; 370/395.43

(58) Field of Classification Search ......... 370/231–235, 370/252–329, 338, 343, 395.4, 395.41, 395.42, 370/395.43, 465–469, 337, 331–345; 455/522
See application file for complete search history.

(56) References Cited

U.S. PATENT DOCUMENTS

| 6,192,230 | B1 | 2/2001 | van Bokhorst et al. |
| 6,285,886 | B1 | 9/2001 | Kamel et al. |
| 6,327,256 | B1 | 12/2001 | Paivike et al. |

(Continued)

FOREIGN PATENT DOCUMENTS

JP 2002314578 10/2002

(Continued)

OTHER PUBLICATIONS

Singapore Search and Examination Report for Singapore Application No. 200700757-8.

(Continued)

*Primary Examiner*—Afsar M. Qureshi
(74) *Attorney, Agent, or Firm*—Alston & Bird LLP

(57) ABSTRACT

Apparatus, and an associated method, for reporting QoS information associated with a reverse link communication service effectuated in a radio communication system, such as a CDMA2000 cellular communication system. The mobile station includes a service quality level selector that selects a selected service quality level, such as a communication rate, at which the communication service is to be effectuated. The mobile station further selectably includes a message generator that generates a service quality indication message. A detector detects the scheduling architecture of a network part of the communication system with which the mobile station communicates. And, information contained in the message generated by the message generator is dependent, in part, upon the scheduling architecture.

25 Claims, 6 Drawing Sheets

U.S. PATENT DOCUMENTS

| | | | |
|---|---|---|---|
| 6,374,112 | B1 | 4/2002 | Widegren et al. |
| 6,385,451 | B1 | 5/2002 | Kalliokulju et al. |
| 6,570,860 | B2 | 5/2003 | Hämäläinen et al. |
| 6,717,926 | B1 | 4/2004 | Deboille et al. |
| 6,760,311 | B1 | 7/2004 | Raith |
| 6,785,252 | B1 * | 8/2004 | Zimmerman et al. ........ 370/337 |
| 6,819,935 | B2 | 11/2004 | Kenney et al. |
| 6,859,639 | B2 | 2/2005 | Spratt et al. |
| 7,158,504 | B2 | 1/2007 | Kadaba et al. |
| 7,336,632 | B2 * | 2/2008 | Cheng et al. ................ 370/329 |
| 7,424,295 | B2 | 9/2008 | Isobe et al. |
| 2003/0050086 | A1 | 3/2003 | Lee et al. |
| 2003/0054848 | A1 * | 3/2003 | Kenney et al. .............. 455/522 |
| 2004/0062206 | A1 * | 4/2004 | Soong et al. ................ 370/252 |
| 2004/0228296 | A1 | 11/2004 | Lenzini et al. |

FOREIGN PATENT DOCUMENTS

| | | |
|---|---|---|
| RU | 2 131 168 | 5/1999 |
| WO | WO 00/31990 | 6/2000 |
| WO | WO 01/20851 | 3/2001 |
| WO | WO 02/05454 A2 | 1/2002 |
| WO | WO 02/27969 | 4/2002 |
| WO | WO 03/067783 | 8/2003 |

OTHER PUBLICATIONS

Zhouyue Pi and R. Thomas Derryberry, "CDMA2000 1x EV-DV Reverse Link System Design," WCNC 2003—IEEE Wireless Communications and Networking Conference, vol. 4, No. 1, Mar. 2003, pp. 514-519.

3GPP2 S.R0079-0, support for End-to-End QoS Stage 1 Requirements, Version 1.0, May 13, 2004.

Youngsung Moon; *Function of Each Layer of ATM Protocol*; ATM Engineering; pp. 37-40; Dasung Publishing Co; Korea (English Translation Only).

*cdma2000® Wireless IP Network Standard: Quality of Service and Header Reduction*; 3$^{rd}$ Generation Partnership Project 2 "3GPPZ"; Jul. 2003; pp. 2 - 45.

*Medium Access Control (MAC) Standard for cdma2000 Spread Spectrum Systems*; 3$^{rd}$ Generation Partnership Project 2 "3GPPZ"; Mar. 28, 2002; pp. 2 - 9.

* cited by examiner

APPARATUS, AND ASSOCIATED METHOD, FOR SELECTING QUALITY OF SERVICE-RELATED INFORMATION IN A RADIO COMMUNICATION SYSTEM

CROSS-REFERENCE TO RELATED APPLICATIONS

This application is a continuation of U.S. application Ser. No. 10/921,088, filed Aug. 18, 2004, now U.S. Pat. No. 7,336,632, which claims the priority of provisional patent application Ser. No. 60/496,177, filed on 18 Aug. 2003, the contents of which are incorporated herein.

BACKGROUND OF THE INVENTION

The present invention relates generally to data communications in a packet radio communication system, such as a CDMA2000 cellular communication system that provides 1xEV-DV or 1xEV-DO data communication services. More particularly, the present invention relates to apparatus, and an associated method, by which to select communication quality of service (QoS) information, such as a communication rate, for a reverse link communication service.

When in a distributed implementation, the quality of service information is selected at a MAC (Medium Access Control) layer of a mobile station. When in a centralized implementation, a layer 2, e.g., MAC-layer (medium access control-layer) message is further formed that indicates the QoS information that identifies the service quality level desired by which to effectuate a particular communication service. The information contained in the message is, e.g., of a first type or of a second type depending upon the location of a network scheduler in a centralized implementation. Quicker, and therefore better, scheduling of communication resources is provided. And, separate scheduling of resources for multiple communication service instance s, during a common time period, is also provided.

New-generation, cellular communication systems, have introduced the concept of quality of service (QoS) levels at which to effectuate communication services. The QoS level defines, in some manner, the service quality level at which a communication service is to be effectuated. Generally, there is a correlation between the amount of resources allocated to effectuate a communication service and the service quality level at which the communication service is effectuated. That is to say, generally, a higher service quality level is achievable when greater amounts of communication resources are allocated to the communication service.

A packet communication service, such as a 1xEV-DV or 1xEV-DO communication service, of a CDMA2000-compliant, cellular communication system, for instance, defines QoS levels that are to be maintained pursuant to effectuation of a communication service. A QoS level is mandated, for instance, pursuant to a service subscription or pursuant to a packet communication service-type. For a communication service to be effectuated at a particular service quality level, an appropriate level of communication resources must be allocated by way of which to effectuate the communication service. The communication resources are allocated by a system scheduler that schedules the allocation of communication resources. Information related to the service quality level at which the communication service is to be effectuated must be provided to the scheduler for the scheduler properly to allocate the communication resources, if available. When, for instance, the communication service is initiated by a mobile station, the mobile station must provide the service quality information to the scheduler so that the appropriate level of communication resources are allocated.

The quality of service (QoS) is an end-to-end characteristic of, e.g., a data call, where each element in the wireless IP (Internet Protocol) network is a contributor. The radio link is considered an important element in the end-to-end architecture due to the unpredictable nature of the wireless link. There are many QoS attributes defined for CDMA2000 radio link QoS, e.g., the data rate, the delay, the jitter, the error rate, the priority, etc.

The CDMA2000 medium access control (MAC) layer, where the radio QoS control function is implemented, provides a key interface between the upper layers and physical layer of a CDMA2000 communication station. Currently, with respect to QoS control, the MAC layer handles indirect QoS information that is reported over layer 3 signaling, e.g., as a QoS BLOB (binary large object block) to request radio link QoS. The QoS control mechanism and radio resource allocation scheme at the network part of the CDMA2000 communication system is implementation dependent and, presently, is not standardized.

Various QoS control functions and their associated signaling mechanisms have been extensively studied with the goal of satisfying QoS requirements for advanced applications in efficient manners that effectively utilize available radio resources. With respect to the CDMA2000 communication system, it is commonly known that MAC/physical signaling permits mobile stations to feed back QoS information and to allow network scheduling of communication services with the mobiles and satisfy the associated QoS requirements. MAC-layer signaling provides better and faster resource scheduling in contrast with layer 3 signaling in order to meet radio link QoS requirements. For instance, QoS control or resource allocation of CDMA2000 1xEV-DV reverse link communications involves many considerations. Discussion related to these consideration factors is made, e.g., in an existing 1xEV-DV Rev. D standard developments. QoS control or resource allocation of CDMA2000 1xEV-DO reverse link communications analogously also involves many considerations.

Mobile stations operable in a CDMA2000 communication system, as well as others, are capable of multiple data service instances that are active at the same time. Different ones of the multiple data services have different QoS requirements. Each data instance carries its own data flow to or from an upper layer application. Due to the data service instances, each being associated with a QoS requirement, a manner is required by which to schedule the separate service instances. Scheduling is required for both the forward link and the reverse link. On the forward link, a network entity can schedule each service based upon its QoS information and buffer status, thereby to provide inter-user or intra-user QoS support. But, for purposes of reverse-link scheduling, data arrival and buffer status inside of a mobile station is not known to the network. Such information has to be reported to the network in order that reverse link resource assignment can be made.

With respect to 1xEV-DV communication services, a reverse-link MAC control mechanism proposal has been set forth. In the proposal, an R-RCH (reverse request channel) is defined. The R-RCH is used by the mobile station upon which to make a reverse link rate request. And, in current CDMA2000 1xEV-DV reverse link proposals, a mobile station provides buffer status and available transmit power indications that are provided to the network of QoS attribute adjustments that are needed pursuant to a communication service instance. The network part of the communication system manipulates QoS parameters to obtain an improved QoS for the communication instance. The network, however, typically manages many concurrent flows upon the radio air interface. And, although the indication set forth in the existing proposal provides the network with enough information to permit blind manipulation of the QoS attributes to obtain an improved QoS for a particular communication service instance, the network is not provided with information related to the service instance type. For instance, the service instance type includes conversational streaming, interactive communications, background communications, etc. And, the network is unable efficiently to calibrate the QoS attributes on a per flow basis or on a per user basis. Furthermore, due to an implementation in which the scheduling functionality is embodied at a base station at the network part, the QoS request indication will affect the effectiveness of the scheduling functionality. Scheduling functionality is centralized or distributed. When centralized, a centralized scheduler is located at a base station controller (BSC) of the network part. And, when distributed, the scheduler functionality is located at the base station. The different entities have different scopes of QoS control. And, accordingly, QoS indications delivered to scheduling entities embodied at the base station controller and base station should contain different information.

Existing proposals fail to address the differing informational needs of the scheduling functionality, depending upon whether the scheduling functionality is centralized or distributed.

Existing proposals also fail to provide adequate mechanisms by which to fulfill QoS differentiation for differing communication service instances on an intra-user, i.e., resource allocation amongst different users, and intra-user, i.e., resource allocation amongst services for a single user.

An improved manner by which to select QoS-related information associated with a reverse-link communication service is, therefore, required.

It is in light of this background information related to data communication services in a radio communication system that the significant improvements of the present invention have evolved.

SUMMARY OF THE INVENTION

The present invention, accordingly, advantageously provides apparatus, and an associated method, by which to communicate data in a packet radio communication system, such as a CDMA2000, cellular communication system that provides 1xEV-DV or 1xEV-DO data communication services.

Through operation of an embodiment of the present invention, a manner is provided by which efficiently to select and/or report communication quality of service (QoS) information to permit scheduling of communication resources. Selection is made at a MAC layer of the mobile station. And, if a QoS report, formed of a MAC-layer (medium access control-layer) message is formed. The message indicates the QoS information that is desired pursuant to a particular communication service. The information that is contained in the MAC-layer message is of a first type when the communication system utilizes a scheduling architecture embodied at a base station. And, the layer 2 message is of a second type when the communication system utilizes a scheduling architecture embodied at a base station controller.

Scheduling of communication resources for effectuation of a communication service is made more quickly, thereby facilitating communications in the communication system. Separate scheduling of resources for multiple communication service instances at a mobile station, during a common time period, is also provided.

In one implementation, a communication device for communicating rate request information for a service instance over a medium access control (MAC) channel comprises a receiver for receiving a command signal. The command signal indicates that a rate scheduler is located at a base station or at a base station controller. A rate request mechanism resides at the mobile station and provides a MAC channel packet that comprises a traffic class identifier. The traffic class identifier is associated with the service instance if the rate scheduler is located at the base station. If the rate scheduler is located at a base station controller, a service reference identification (SR_ID) identifies QoS attributes associated with the service instance. A transmitter transmits the MAC channel packet over the MAC channel.

In another aspect of the present invention, indications are provided to a mobile station to indicate the scheduling architecture of the radio access network with which the mobile station is positioned with which to communicate. When a communication service is to be effectuated on a reverse link, i.e., by the mobile station, for delivery to the network part of the communication system, the layer 2, MAC message generated by the mobile station includes information that is dependent upon the scheduling architecture of the radio network. When the scheduling architecture of the radio network includes scheduler entities embodied at base stations of the network, the layer 2, MAC message includes information of a first type, usable by the scheduler entity embodied at the base station. And, when the scheduling architecture is embodied at a base station controller of the radio network, the layer 2, MAC message includes information of a second type, usable by the scheduler entity embodied at the base station controller. Because the message forms a MAC layer message, its communication is effectuated quickly, thereby to effectuate quick allocation of communication resources for the effectuation of the communication service.

The mobile station is, in one implementation, capable of multiple communication service instances. That is to say, the mobile station is capable of performing, during a common time period, more than one communication service, each having an associated quality of service level associated therewith. MAC layer messages are generated to identify the service quality levels associated with the separate communication service instances. Scheduling is performed by the scheduling functionality of the radio network so that the separate communication services are able to be effectuated at their associated service quality levels.

In one implementation, the communication system forms a CDMA2000, cellular communication system that provides for 1xEV-DV or 1xEV-DO data communication services. When a reverse-link, data service is to be effectuated, a layer 2, e.g., MAC layer, message is generated by the mobile station and communicated to the network part to identify the quality of service level at which the data communication service is to be effectuated. And, a scheduler embodied at the network part allocates communication resources to permit the effectuation of the data service at the desired service quality level. The information contained in the message is dependent upon the scheduling architecture of the communication system. That is to say, if the scheduling architecture is located at base stations, the information contained in the MAC layer message is of a first type, and if the scheduling architecture is located at a base station controller, the information contained in the MAC layer message is of a second type.

Because MAC layer signaling is utilized, quick allocation of channel resources to permit effectuation of the data communication service is quickly performed, improving communications in the communication system.

In these and other aspects, therefore, apparatus, and an associated method is provided for a communication device operable to effectuate a communication service. The communication device has logical layers including an upper logical layer, a lower logical layer, and an intermediate layer positioned therebetween. A service quality indication message generator is embodied at the intermediate layer of the communication device. The service quality indication message generator generates a service quality indication message that indicates a selected service quality level at which the communication service is to be effectuated. The service quality indication message forms an intermediate layer message. A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
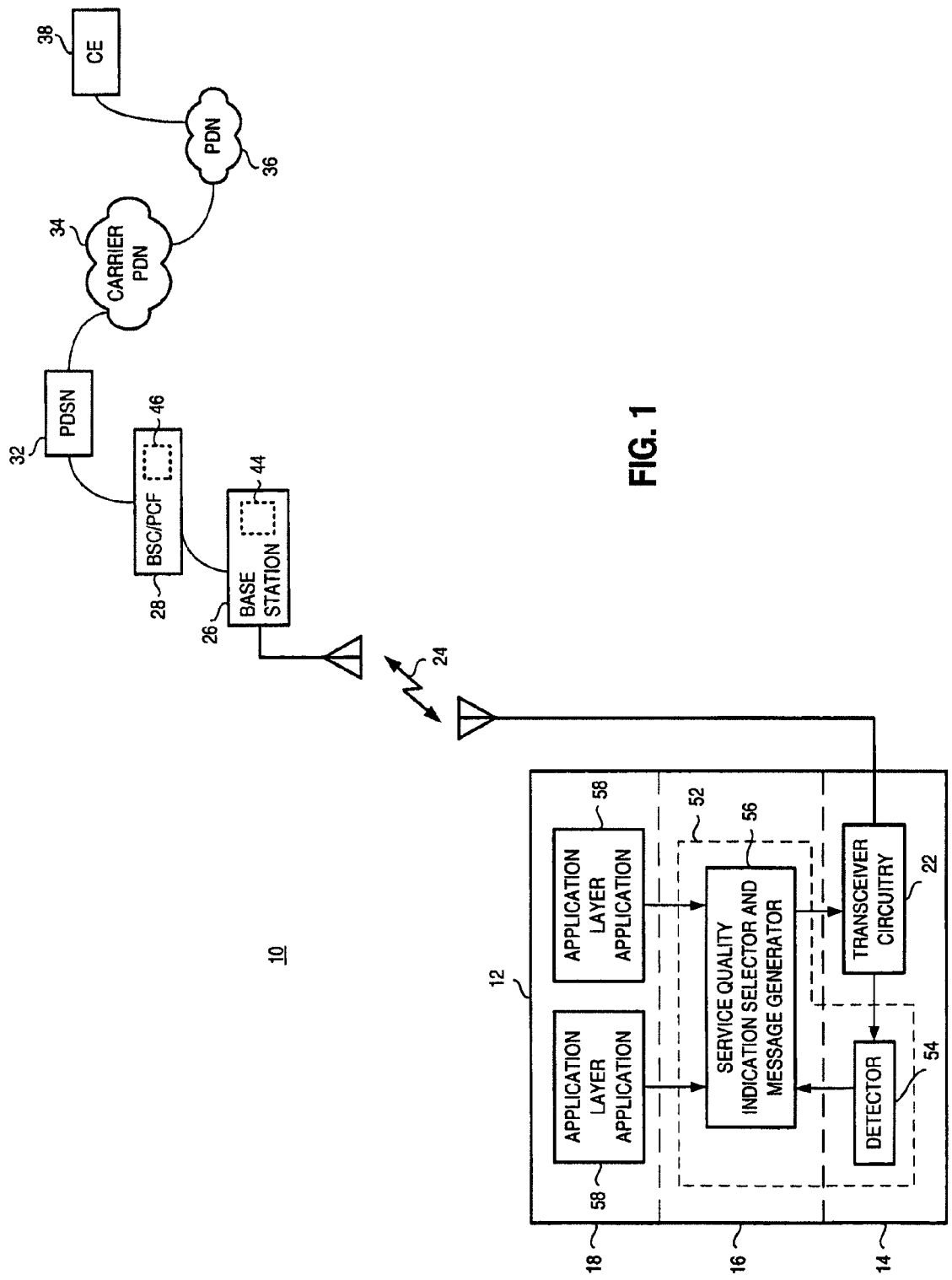
FIG. 1 illustrates a functional block diagram of a radio communication system in which an embodiment of the present invention is operable.

Referring first to FIG. 1, a radio communication system, shown generally at 10, provides for the effectuation of communication services by, and with, mobile stations, of which the mobile station 12 is representative. The communication system 10, in the exemplary implementation, forms a CDMA2000, cellular communication system, operable in general conformity with the operating protocol set forth in the CDMA2000 operating specification. The implementation of the communication system as a CDMA2000 operating system, however, is also representative of other types of cellular, and other, communication systems. Accordingly, while the following description shall describe exemplary operation of an embodiment of the present invention in which the communication system is operable pursuant to the operating protocols of the CDMA2000 communication system, description of operation of an embodiment of the present invention implemented in another communication system is analogous. And, more particularly, the CDMA2000 communication system is here operable to perform high speed data communication services, such as 1xEV-DV or 1xEV-DO communication services. When the communication system is implemented in other manners, analogous data communication services are implementable.

The mobile station 12 is here represented in terms of logical layers, of which three of the logical layers are represented in the figure. A physical layer 14, an intermediate, e.g., MAC layer (2L) layer 16, and an upper layer 18 are shown in the figure.

Transceiver circuitry 22 of the mobile station is formed at the physical layer 14. During operation of the mobile station, the transceiver circuitry operates to transceive data, such as data communicated during effectuation of a 1xEV-DV or 1xEV-DO communication service with a network part of the communication system. Data is communicated by way of channels defined upon a radio air interface. The radio air interface is represented by the arrow 24 in the figure. Forward link and reverse link channels are defined upon the radio air interface. Data communicated by the network part to the mobile station is communicated upon forward link channels. And, data communicated by the mobile station to the network part is communicated upon reverse link channels.

Entities of the network part shown in the figure include packet-switched entities of the network part. Circuit-switched entities are not shown for purposes of simplicity.

The network part includes a base station (BS) 26. The base station includes transceiver circuitry capable of transceiving data with the mobile station. A base station controller/point control function (BSC/PCF) 28. The base station controller operates, amongst other things, to control operation of the base station 26. And, the base station controller, in turn, is coupled to a packet data support node (PDSN) 32. The packet data support node forms a gateway to a carrier packet data network 34 and, in turn, a packet data network (PDN) 36, such as the Internet backbone. Correspondent entities, such as the correspondent entities (CE) 38, are coupled to the packet data network. The correspondent entity is representative of any of various types of communication devices capable of sending or receiving packet-formatted data. End-to-end communication services between the mobile station 12 and the correspondent entity 38 are effectuated by appropriate communication connections formed through the network part of the communication system and the radio air interface 24.

Quality of service (QoS) levels are associated with communications in the CDMA2000 communication system. Quality of service is defined in various manners, dependent upon various factors, e.g., communication rate. Generally, in order for a communication service to be effectuated at a selected service quality level, the level of communication resources allocated to the communication service must be set at an appropriate level. In one implementation, a scheduling entity is embodied at the network part of the communication system. The scheduling entity operates, amongst other things, to schedule communication resources so that communication services are able to be effectuated at the desired QoS levels. The scheduling entity, as noted previously, is implementation-dependent. A scheduler forming the scheduling entity is, in one implementation, distributed in the communication system, e.g., embodied at base stations, such as the base station 26 of the network part, or elsewhere. A scheduler 44 embodied at the base station 26 is representative of such a scheduling architecture. Alternately, the scheduling entity is embodied at the base station controller 28. A scheduler 46 embodied at the base station controller is representative of such a scheduling architecture.

When the communication service originates at the network part of the communication system for delivery to the mobile station, the scheduler, of whichever architecture, is able easily to obtain information related to the QoS associated with the communication service. But, when the communication service originates at the mobile station for communication to the network part, the scheduler is only made aware of the QoS to be associated with the communication service if the mobile station notifies the scheduler. While existing proposals have been set forth to use a layer 3 binary large object block (BLOB), such higher-level signaling is slow, and also for other reasons is inadequate.

The mobile station includes apparatus 52 that selects service quality levels and, in one implementation, provides indications of the QoS to be associated with a communication service instance originated at the mobile station to permit the scheduling entity to schedule communication resources to facilitate the effectuation of the communication service at the desired QoS level. The elements forming the apparatus are functionally represented and are implementable in any desired manner, such as by algorithms executable by processing circuitry.

Here, the apparatus includes a detector 54 and a service quality indication selector and message generator 56. The detector is coupled to the transceiver circuitry and operates to detect indications sent by the network to identify the scheduling architecture of the network. That is to say, the network sends signals that identify its system architecture. Thereby, the mobile station is made aware of whether the scheduling architecture of the network is distributed or is centralized. The detections made by the detector are provided to the selector message generator. The detector is here shown at the physical layer. The detector alternately is positionable elsewhere.

The signal quality indication message generator is further coupled to the upper level logical layer 18, here, the application layer 58, at which the communication service data is formed. Two application layer applications 58 are shown in the figure to represent the multiple service instance capability of the mobile station. The message generator operates to generate a service quality indication message associated with each communication service that is to be performed by the mobile station. The service quality indication message identifies the QoS that is to be associated with the communication service. Once generated, the message is provided to the transceiver circuitry and the message is transmitted. The message generator here forms a MAC-layer message, a layer 2 message. The message, when delivered to the network, is provided to the scheduler so that scheduling of communication resources to effectuate the reverse-link communication service are allocated to permit the effectuation of the communication service at the desired QoS level.

The information contained in the message is dependent, not only upon the QoS level that is associated with the communication service, but also responsive to the scheduling architecture of the network. When the scheduling architecture is of one type, the information contained in the message is of a first type, usable by the scheduler 44 embodied at the base station. And, when the scheduling architecture is of another type, the information contained in the message is of a second type, usable by the scheduler 46. When the scheduling architecture is of the first type, the message formed by the message generator includes a service reference identifier (SR_ID) and a buffer size/status and/or mobile station transmitting power. When the scheduling architecture is of the second type, the message generated by the message generator includes an indication of the traffic class of the communication service. And, the buffer size/status and/or the mobile station transmitting power is also contained in the message.

Figure 2:
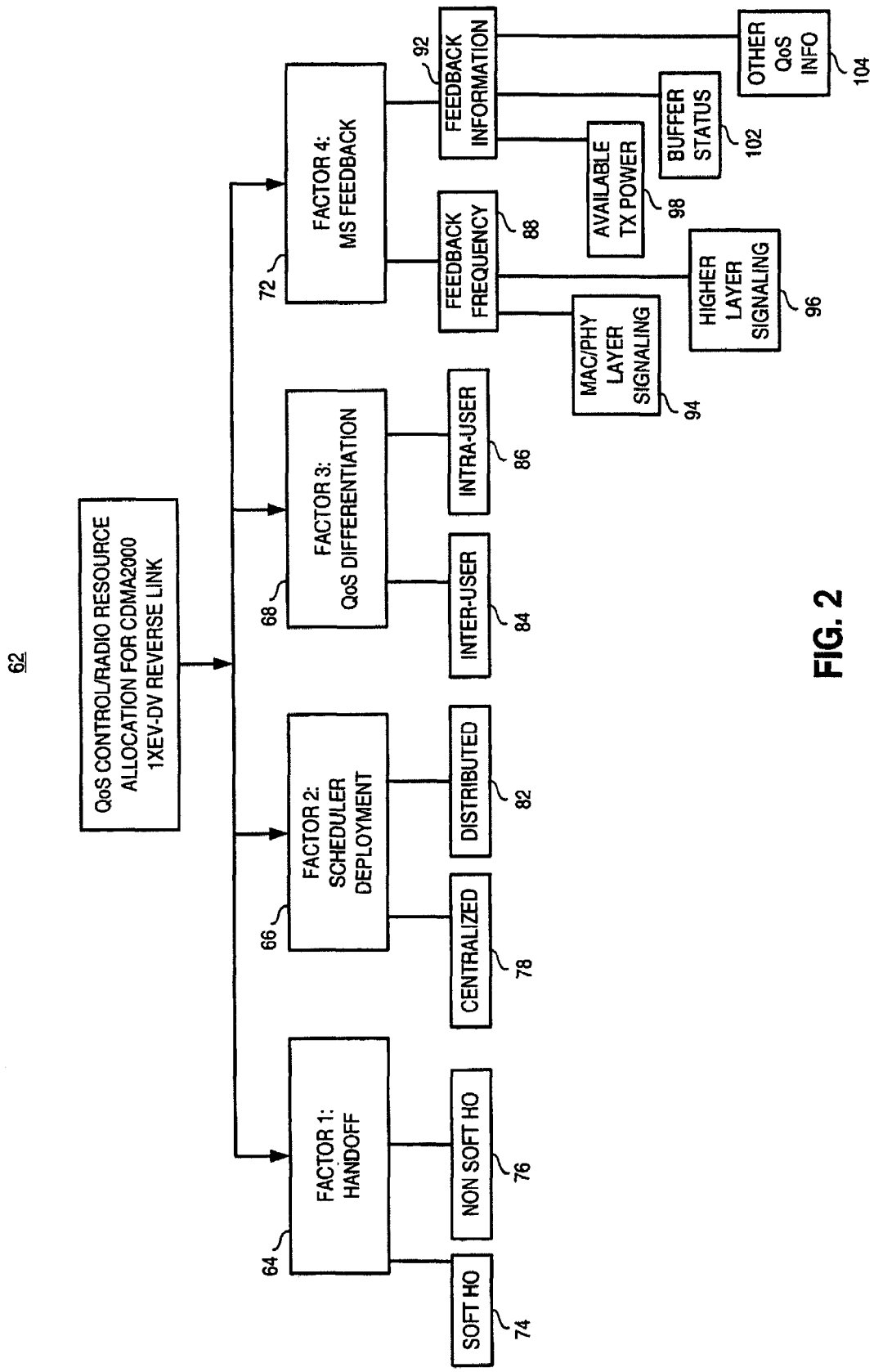
FIG. 2 illustrates a representation of factors that are considered in the design of quality of service (QoS) control associated with effectuation of communication services.

FIG. 2 illustrates a representation, shown generally at 62, that identifies the factors that are considered in the design of QoS control for reverse link communications, such as effectuation of reverse link 1xEV-DV and 1xEV-DO communication services in a CDMA2000 system. Four factors are illustrated, handoff 64, scheduler deployment 66, QoS differentiation 68, and mobile station feedback 72. The handoff factor includes soft handoff 74 and non-soft handoff 76. The scheduler deployment factor includes centralized and distributed architectures 78 and 82. The QoS differentiation factor includes inter-user and intra-user differentiations 84 and 86. The mobile station feedback factors include feedback frequency 88 and feedback information 92. Sub-factors of the feedback frequency factor include MAC/PHY layer signaling 94 and higher layer signaling 96. And, sub-factors of feedback information include available transmit power 98, buffer status 102, and other QoS information 104.

The consideration factors are all correlated and should be considered together when designing the QoS control for the reverse link. Through operation of an embodiment of the present invention, the scheduling deployment factor and the QoS differentiation are leveraged and the QoS differentiation and mobile station feedback factors are leveraged. And, through operation of an embodiment of the present invention, MAC signaling between the mobile station and the base station pursuant to 1xEV-DV or 1xEV-DO reverse link communication services is utilized. Multiple data service instances, active at the same time at the mobile station, with different QoS requirements, are handled pursuant to operation of an embodiment of the present invention. Each data instance carries its own data flow to or from the upper layer application. While forward link communications are readily handled by the base station for each service based upon its associated QoS information and buffer status. Inter-user and intra-user QoS support is also provided on the forward link. Through operation of an embodiment of the present invention, the packet arrival and buffer status inside of the mobile station is reported to the network so that the resource assignment can be made by the scheduling entity thereof.

The CDMA2000 network architecture consists of two scheduling schemes. The scheduling schemes comprise centralized scheduling and distributed scheduling.

In centralized scheduling, the scheduler is co-located with the base station controller and is responsible for simultaneous scheduling of mobile stations across multiple cells. In other words, this type of scheduler, i.e., the scheduler 46 shown in FIG. 1, performs scheduling on a large scale including soft handoff consideration. Centralized scheduling is suitable, e.g., for slow fading and constant bid rate conditions.

The base station controller, and centralized scheduler, has the knowledge of each individual service. For example, the base station controller is aware of a service instance, SR_ID and its QoS requirement.

In another architecture, each base station in the active set performs the scheduling without coordination between the base stations. During soft handoff, the mobile station uses a certain rule to decide the rate assignment from the active set. A scheduling architecture of this type experiences shorter delay and has fresher knowledge about the radio channel and traffic conditions. Distributed scheduling is particularly suitable in conditions of fast fading and variable bit rate services.

The base station, and its distributed scheduler, e.g., the scheduler 44 shown in FIG. 1, does not have knowledge of each individual communication service. For example, the base station may not be aware of the service instance, SR_ID, and its QoS requirement.

Figure 3:
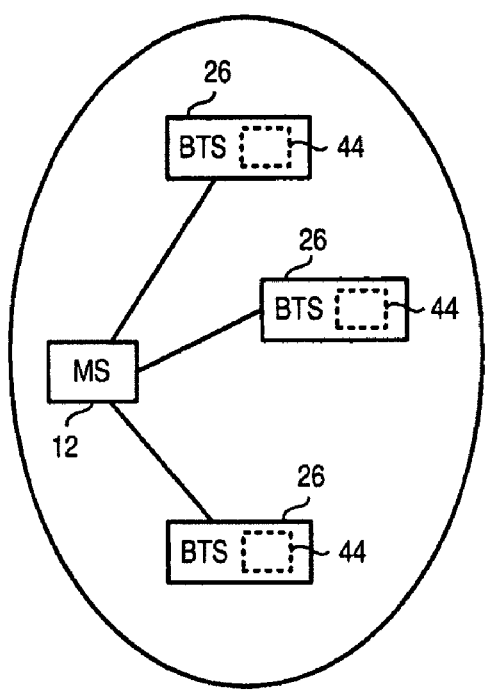
FIG. 3 illustrates a representation of a distributed scheduling architecture of a scheduler embodied at a radio network part of the communication system according to an exemplary implementation of a radio communication system.

FIG. 3 illustrates a representation of a distributed scheduling architecture in which a plurality of base stations 26 are positioned in conventional manner. Each base station includes a scheduler 44. A mobile station 12 is also shown in the Figure.

Figure 4:
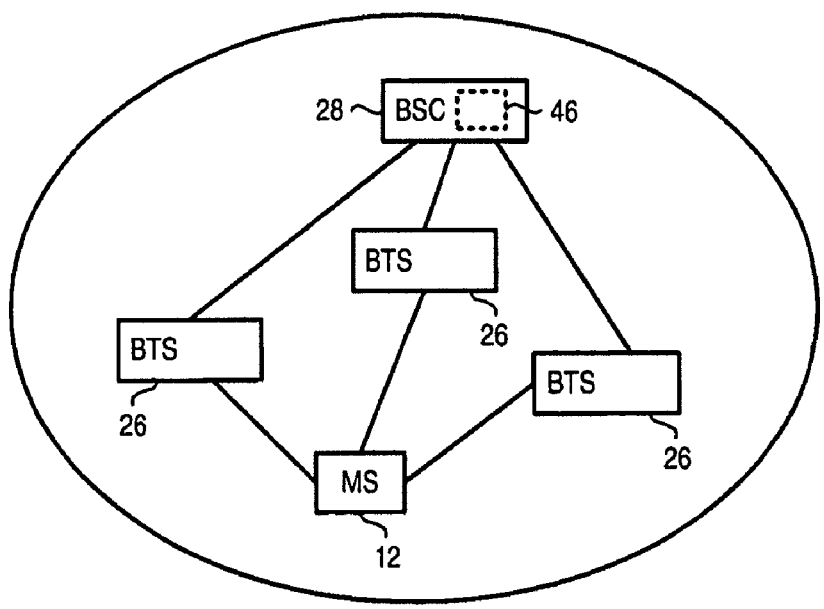
FIG. 4 illustrates a representation of a centralized scheduling architecture of a scheduler embodied at the network part of the communication system shown in FIG. 1 according to another exemplary implementation.

FIG. 4 illustrates an exemplary, centralized scheme. That is to say, the scheduler 46 is embodied at the base station controller 28. The base station controller is coupled to a plurality of base stations 26. A mobile station 12 is also shown in the figure. The representations of both FIGS. 3 and 4 assume the backhaul resource. Scheduling architectures normally co-exist in the network part of the communication system. Alternately, the scheduler is implemented at a selected one of the base station controller or the base stations. The QoS requirement of each connected service is supported in each of the scheduling environments.

When centralized scheduling is utilized, i.e., the network comprises a centralized scheduler, the scheduler is located within the base station controller, such as the scheduler 46 embodied at the base station controller shown in FIG. 1. When the mobile station negotiates a connection establishment for a service instance, a service reference identifier, SR_ID, is assigned, and negotiated QoS attributes are stored at the base station controller. When the mobile station makes a rate request for the connected instance, i.e., the communication service instance, the following information is reported: SR_ID, and the buffer size/status and/or the mobile station transmitting power.

The three-bit SR_ID identifies the requesting data instance and the buffer size indicates the current buffered data waiting for transmission on the reverse link. The base station controller receives the QoS attributes for the data instance from the SR_ID. And, a determination is made of the priority of the rate request. A grant decision is made based upon the current buffer size of the data instance, the transmitting power of the mobile station, and the QoS requirements on the data rate, delay, and error rate.

Due to the reverse feedback with the SR_ID, the centralized scheduler 46 differentiates QoS amongst applications for a particular mobile station when, e.g., multiple communication service instances are concurrently performed.

When distributed scheduling is performed, the SR_ID is not known to the base station. The mobile station is required to feedback some QoS profile information to assist the base station in making the decision. Traffic classes amongst the QoS attributes are defined for end-to-end quality of service. It represents the QoS category of the service instance.

When the mobile station makes the rate request for the connected instance, the following information is reported: the traffic class and the buffer size/status and/or the mobile station transmitting power.

The base station makes the rate grant decision based upon the traffic class of the connected service, the amount of data in its buffer, and/or the mobile station transmitting power. During a soft handoff, the mobile station utilizes some rule, e.g., an or-of-down rule to decide the rate assignment. Even if multiple data instances concurrently performed at the mobile station belong to the same traffic class, the base station still is able to satisfy the requirement of each instance as the rate request and resource assignment are handled in synchronous manner.

Figure 5:
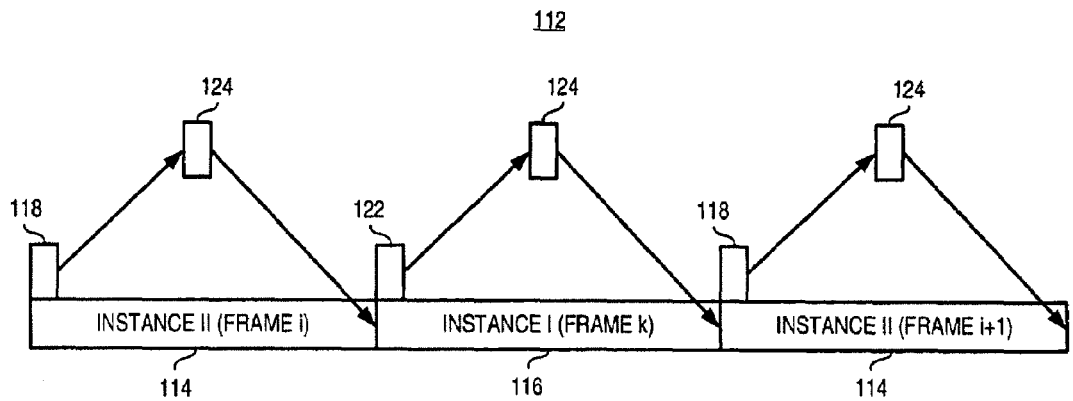
FIG. 5 illustrates a timing diagram indicating messages generated during exemplary operation of an embodiment of the present invention.

FIG. 5 illustrates a timing diagram 112 representative of exemplary timing relationships in exemplary operation of a multiple instance implementation of the communication system shown in FIG. 1. Two instances, instance II and instance I 114 and 116, respectively, are shown in the diagram. Two frames of the second instance are shown. Rate requests 118 and 122 for the first and second instances are shown. And, the rate grants 124, responsive to the rate requests, are also represented in the figure.

Due to the reverse feedback with traffic class indications, the distributed scheduler 44 is able to differentiate the QoS levels amongst users. With respect to scheduling mode selection, the mobile station reports the amount of data in its buffer and/or the transmitting power in either of the centralized or distributed scheduling environments. The only control information that is reported differently is the SR_ID versus traffic class. During the service connection or configuration, the network, e.g., the base station or base station controller, indicates the scheduling mode. The network also provides information to instruct the mobile station what to report, e.g., either the SR_ID or the traffic class. When both of the schedulers are co-located, and the switch is required during the call, the base station notifies the mobile station to change the reporting field by, e.g., UHDM (universal handoff direction message) or a service configuration message.

Figure 6:
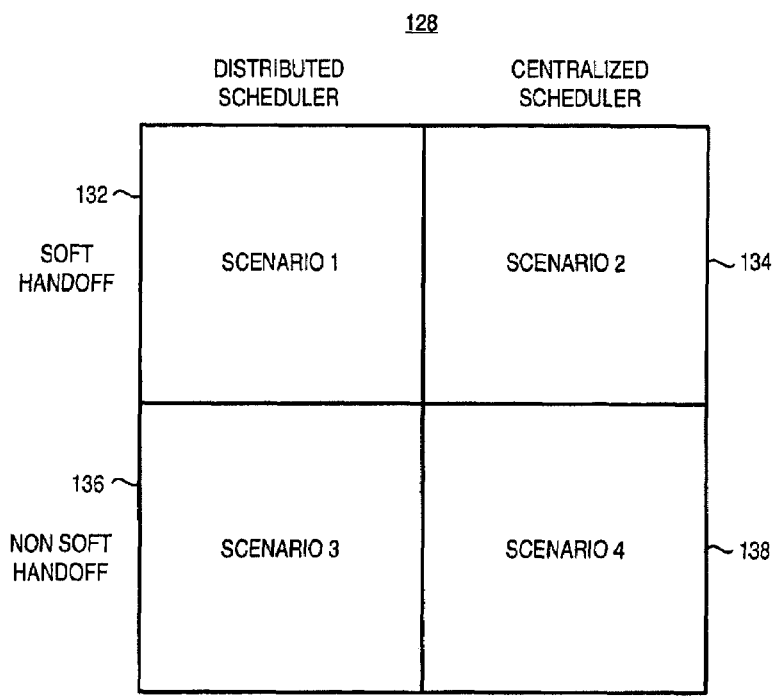
FIG. 6 illustrates a representation of handoff and scheduling architecture combinations of possible implementations and operation of the radio communication system shown in FIG. 1.

FIG. 6 illustrates a representation 128 that identifies the combinations of possible scenarios of scheduler implementations and soft/non-soft handoff. Four scenarios 132, 134, 136, and 138 are possible.

The communication services are of any of various types, implementable in the exemplary implementations as 1xEV-DV or 1xEV-DO data services effectuated on a reverse link. Conversational, streaming, interactive, and background classes, as well as others, all are implementable and are representative of the communication services facilitated pursuant to operation of an embodiment of the present invention. A conversational class has the attributes of two-way, low delay, low data loss rate, and sensitive to delay variations. A streaming class is similar, but is one-way and is less sensitive to delay. A streaming class communication service sometimes requires high bandwidth. An interactive class of communication service is two-way, bursty, and of variable bandwidth requirements, with moderate delay, and moderate data loss rate, correctable in-part. A background class is highly tolerant to delay and data loss rate, and the background class exhibits variable bandwidth.

Figure 7:
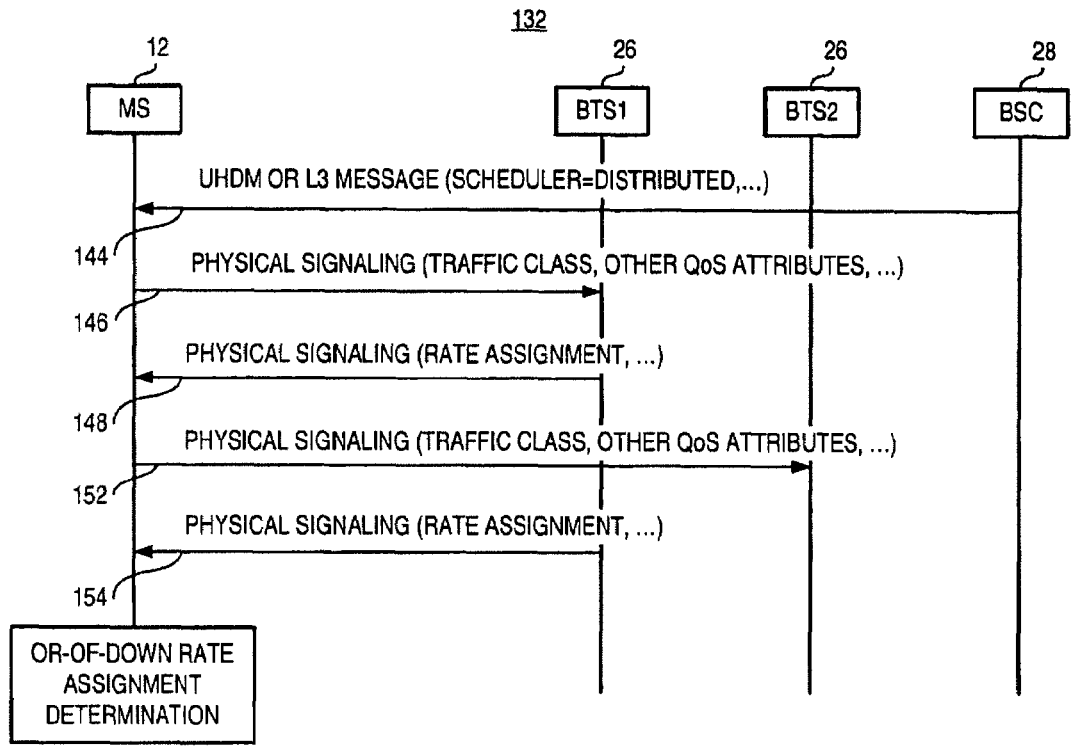
FIG. 7 illustrates a message sequence diagram representing signaling generated during first exemplary operation of an embodiment of the present invention.

FIG. 7 illustrates a message sequence diagram, represented at 132, representative of signaling generated pursuant to a scenario-1 implementation identified as the scenario 1 in FIG. 6. Signals 144, 146, 148, 152, and 154 are communicated between the mobile station and various base stations 26.

Figure 8:
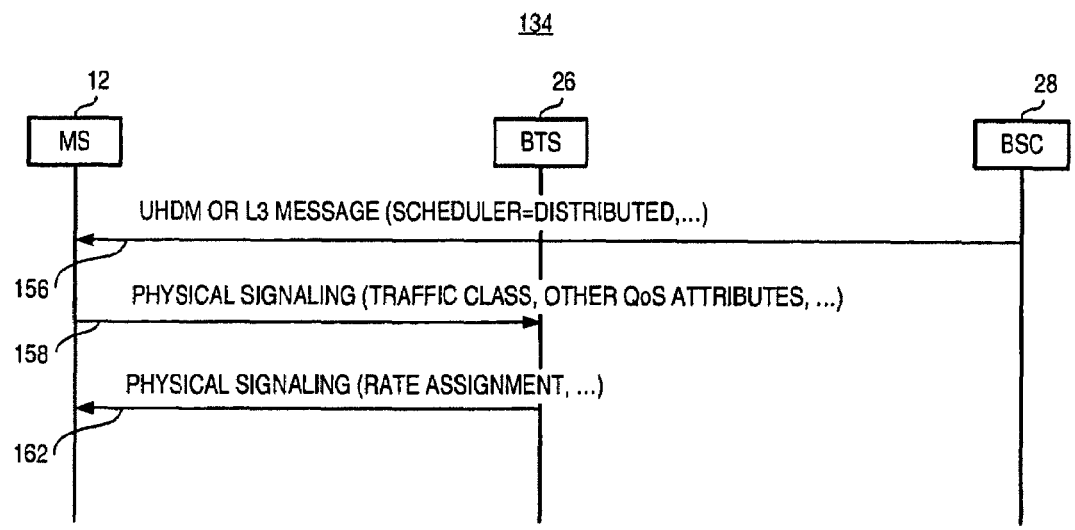
FIG. 8 illustrates a message sequence diagram representative of signaling generating during second exemplary operation of an embodiment of the present invention.

FIG. 8 illustrates a message sequence diagram 134, corresponding to the scenario-2 implementation identified in FIG. 6. Signals 156, 158, and 162 are shown, identifying signaling between the mobile station, base station, and base station controller.

Figure 9:
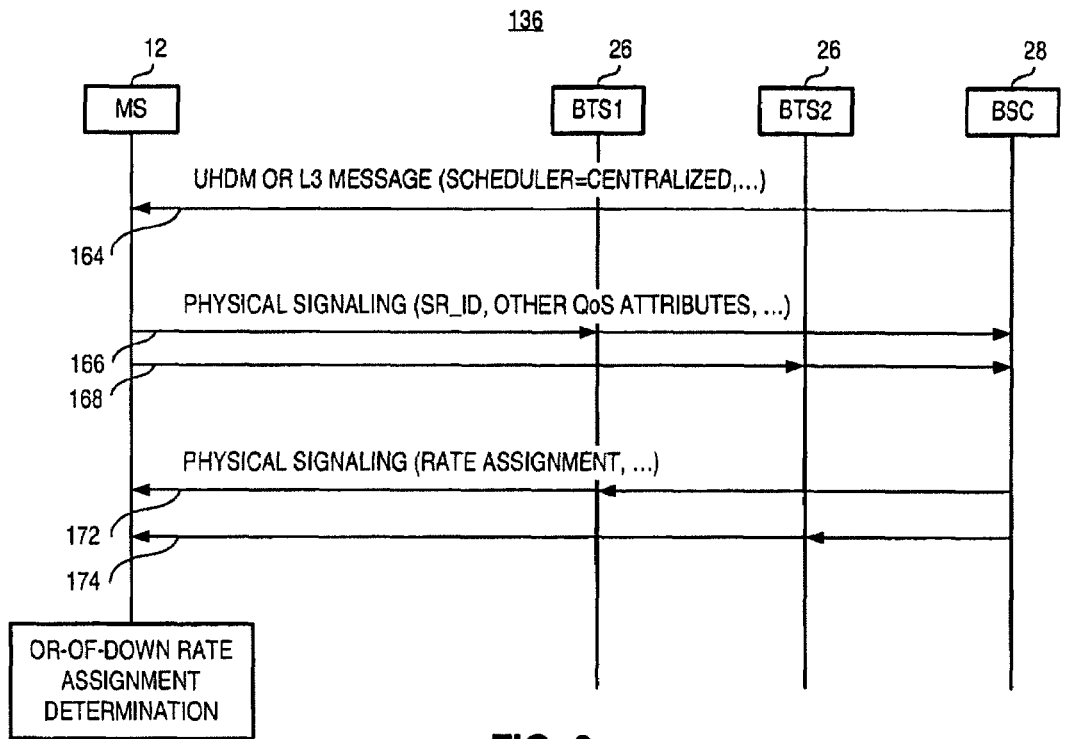
FIG. 9 illustrates a message sequence diagram representative of signaling generated during third exemplary operation of the present invention.

FIG. 9 illustrates a message sequence diagram 136, corresponding to the commonly-referenced scenario implementation identified in FIG. 6. Signals 164, 166, 168, 172, and 174 represent signaling between the mobile station, base stations 26, and base station controller 28.

Figure 10:
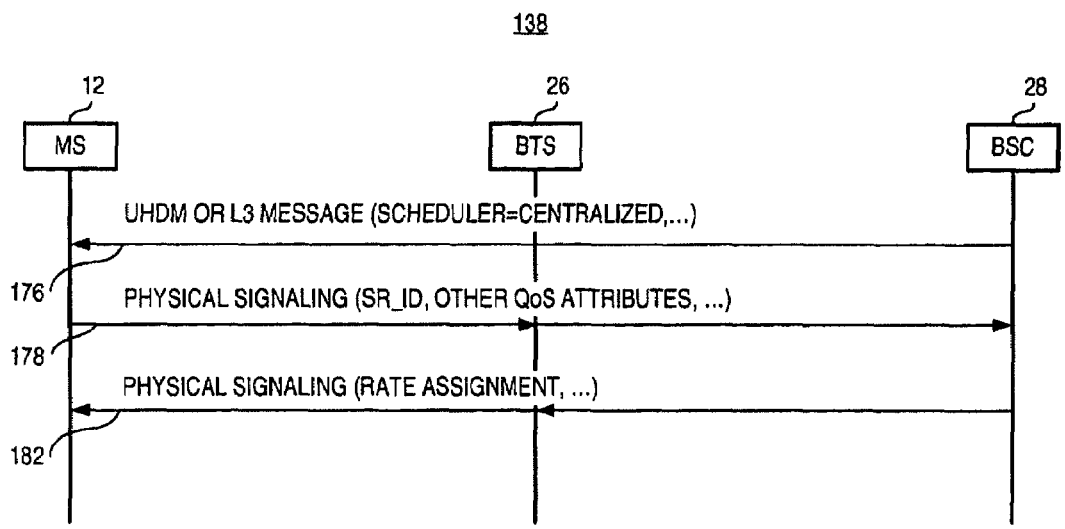
FIG. 10 illustrates a message sequence diagram representative of fourth exemplary signaling generated during operation of an embodiment of the present invention.

FIG. 10 illustrates a message sequence diagram 138 representative of signaling in an implementation corresponding to the corresponding-referenced scenario-4 shown in FIG. 6.

Signals 176, 178, and 182 are representative of signaling generated between the mobile station, base station 26, and base station controller 28.

Thereby, through operation of an embodiment of the present invention, QoS information is provided by a mobile station to the network part of the communication system to permit scheduling of a reverse-link data communication service at a desired QoS level. Layer 2 signaling is used to inform the network part of the QoS requirements, thereby permitting the resource allocations to be made quickly, facilitating communication service effectuation.

The previous descriptions are of preferred examples for implementing the invention, and the scope of the invention should not necessarily be limited by this description. The scope of the present invention is defined by the following claims.

That which is claimed:

1. An apparatus comprising:
   first processing circuitry configured to select a service quality level at which a data flow of a communication service is to be effectuated by the apparatus upon a reverse channel, the service quality level being selected based on an upper-layer application operable by the apparatus, the upper-layer application being associated with the data flow; and
   second processing circuitry configured to generate a service quality indication message indicating the selected service quality level at which the data flow of the communication service is to be effectuated.

2. The apparatus of claim 1, wherein the second processing circuitry being configured to generate a service quality indication message includes being configured to generate a service quality indication message that is transmittable through a Medium Access Control layer.

3. The apparatus of claim 1, wherein the communication service comprises a cdma 2000 packet communication service, and wherein the second processing circuitry being configured to generate a service quality indication message includes being configured to generate a service quality indication message that indicates the service quality level at which the cdma 2000 packet communication service is to be effectuated.

4. The apparatus of claim 3, wherein the cdma 2000 packet communication service comprises a 1x EV-DV communication service, and wherein the second processing circuitry being configured to generate a service quality indication message includes being configured to generate a service quality indication message that indicates the service quality level at which the 1x EV-DV cdma 2000 packet communication service is to be effectuated.

5. The apparatus of claim 3, wherein the cdma 2000 packet communication service comprises a 1x EV-DO communication service, and wherein the second processing circuitry being configured to generate a service quality indication message includes being configured to generate a service quality indication message that indicates the service quality level at which the 1x EV-DO cdma 2000 packet communication service is to be effectuated.

6. The apparatus of claim 1, wherein the apparatus comprises a mobile station of a packet radio communication system that defines a reverse link channel, and wherein the second processing circuitry being configured to generate a service quality indication message includes being configured to generate a service quality indication message that indicates the service quality level at which the communication service is to be effectuated upon the reverse link channel.

7. The apparatus of claim 6, wherein the second processing circuitry being configured to generate a service quality indication message includes being configured to generate a service quality indication message that includes first information when the packet radio communication system is of a distributed scheduling structure.

8. The apparatus of claim 7, wherein the first information comprises an identifier that identifies the communication service, and a transmitting power indication.

9. The apparatus of claim 8, wherein the identifier that identifies the communication service comprises a traffic class indicia.

10. The apparatus of claim 6, wherein the second processing circuitry being configured to generate a service quality indication message includes being configured to generate a service quality indication message that includes second information when the packet radio communication system is of a centralized scheduling architecture.

11. The apparatus of claim 10, wherein the second information comprises an identifier that identifies the communication service, and a buffer indicia.

12. The apparatus of claim 11, wherein the identifier that identifies the communication service comprises a service reference identifier.

13. The apparatus of claim 6, wherein the packet radio communication system further defines a forward link channel, and wherein the apparatus further comprises third processing circuitry configured to detect an indication, communicated to the mobile station upon the forward link, of a type of scheduling architecture of which the packet radio communication system is comprised.

14. The apparatus of claim 13, wherein the service quality indication message is of values of levels responsive, in part, to the indication detected by the third processing circuitry.

15. The apparatus of claim 1, wherein the communication service comprises a first communication data flow and a second communication data flow, and wherein the second processing circuitry is configured to generate a first service quality indication message to identify a first selected service quality level at which the first communication service is to be effectuated, and a second service quality indication message to identify a second selected service quality level at which the second communication service is to be effectuated.

16. The apparatus of claim 1, wherein the first processing circuitry being configured to select a service quality level includes being configured to select service quality levels at which respective data flows of concurrent instances of a communication service are to be effectuated by the apparatus upon a reverse channel, the service quality levels being selected based on upper-layer applications operable by the apparatus, the upper-layer applications being associated with respective instances, and
   wherein the second processing circuitry being configured to generate a service quality indication message includes being configured to generate a service quality indication message indicating at least one of the selected service quality levels at which at least one of the respective data flows of the instances of the communication service is to be effectuated.

17. A method comprising:
   selecting a service quality level at which a data flow of a communication service is to be effectuated by an apparatus upon a reverse channel, the service quality level being selected based on an upper-layer application operable by the apparatus, the upper-layer application being associated with the data flow; and generating a service quality indication message indicating the selected service quality level at which the data flow of the communication service is to be effectuated, wherein selecting a service quality level and generating a service quality indication message are performed by processing circuitry configured to select a service quality level and generate a service quality indication message.

18. The method of claim 17, wherein the communication service is operable in a radio communication system, and wherein the method further comprises detecting indications of scheduling architecture in the radio communication system before selecting the service quality level.

19. The method of claim 18, wherein information contained in the service quality indication message comprises values, responsive in part to detections made as the indications of scheduling architecture are detected.

20. The method of claim 17, wherein selecting a service quality level comprises selecting service quality levels at which respective data flows of concurrent instances of a communication service are to be effectuated by an apparatus upon a reverse channel, the service quality levels being selected based on upper-layer applications operable by the apparatus, the upper-layer applications being associated with respective instances, and wherein generating a service quality indication message comprises generating at least one service quality indication message, the service quality indication message indicating at least one of the selected service quality levels at which at least one of the respective data flows of the instances of the communication service is to be effectuated.

21. An apparatus comprising:

first processing circuitry configured to detect delivery at the apparatus of a service quality indication message that indicates a selected service quality level at which a data flow of a communication service is to be effectuated upon a reverse link channel, the service quality level having been selected based on an upper-layer application, the at least one upper-layer application being associated with the data flow; and second processing circuitry configured to schedule communication resources to permit the effectuation of the communication service upon the reverse link channel at the selected service quality level.

22. The apparatus of claim 21, wherein communication service comprises a cdma 2000 packet communication service, and wherein the service quality indication message indicates the service quality level at which the cdma 2000 packet communication service is to be effectuated.

23. The apparatus of claim 21, wherein first processing circuitry being configured to detect delivery of a service quality indication message includes being configured to detect delivery of a service quality indication message that indicates at least one of a plurality of selected service quality levels at which respective data flows of concurrent instances of a communication service are to be effectuated by the apparatus upon a reverse link channel, the service quality levels having been selected based on upper-layer applications, the upper-layer applications being associated with respective instances.

24. A method comprising:

detecting delivery of a service quality indication message that indicates a selected service quality level at which a data flow of a communication service is to be effectuated upon a reverse link channel, the service quality level having been selected based on an upper-layer application, the at least one upper-layer application being associated with the data flow; and scheduling of communication resources to permit the effectuation of the communication service upon the reverse link channel at the selected service quality level, wherein detecting delivery of a service quality indication message and scheduling of communication resources are performed by processing circuitry configured to detect delivery of a service quality indication message and schedule communication resources.

25. The method of claim 24, wherein detecting delivery of a service quality indication message comprises detecting delivery of a service quality indication message that indicates at least one of a plurality of selected service quality levels at which respective data flows of concurrent instances of a communication service are to be effectuated by the apparatus upon a reverse link channel, the service quality levels having been selected based on upper-layer applications, the upper-layer applications being associated with respective instances.

\* \* \* \* \*